INVENTORS
BOHDAN HURKO
& RAYMOND L. DILLS
BY Richard L. Cashin
THEIR ATTORNEY

United States Patent Office 3,428,435
Patented Feb. 18, 1969

3,428,435
SELF-SUSTAINING CATALYTIC
OXIDATION UNIT
Bohdan Hurko and Raymond L. Dills, Louisville, Ky., assignors to General Electric Company, a corporation of New York
Filed Sept. 15, 1964, Ser. No. 396,551
U.S. Cl. 23—288   5 Claims
Int. Cl. B01j 9/04; F24c 15/00

ABSTRACT OF THE DISCLOSURE

A catalytic oxidation unit useful in treating hot gaseous products emanating from a self-cleaning pyrolytic cooking oven wherein said unit becomes heated thereby to promote an exothermic reaction which will maintain the oxidation unit operational until all smoke, odors and other undesirable properties present in the hot gases are eliminated before the gases are discharged into the atmosphere. The unit comprises a hollow housing with a perforated ceramic block of fine cellular construction having a coating of catalytic material covering the visible surfaces of the ceramic block.

---

This invention was developed as an improvement over the catalytic oxidation unit disclosed and claimed in the patent of Stanley B. Welch—2,900,483 using a catalyst-coated wire screen which has proved quite successful as a means of eliminating smoke, odors and other undesirable properties from the exhaust gases of a domestic oven and particularly a self-cleaning oven using heat cleaning temperatures somewhere between about 750° F. and 950° F. Such a self-cleaning oven is disclosed and claimed in the patent of Bohdan Hurko—3,121,158. Both the Welch and Hurko patents are assigned to the General Electric Company, the assignee of the present invention.

Heretofore, it has been generally common practice to operate catalytic oxidation units at temperatures in the neighborhood of 1,000° F. either by exposing the units to heated atmospheres at this temperature level or by providing supplementary heating means within the unit. This invention relates to a self-sustaining oxidation unit that is operable at much lower temperatures between about 300° F. and 400° F. without requiring the use of supplementary heaters.

The principal object of the present invention is to provide a catalytic oxidation unit for hot gaseous products, where the unit is operational at a minimum temperature on the order of 300° F. and 400° F. without requiring the use of supplemental heaters.

A further object of the present invention is to provide a catalytic oxidation unit incorporating a perforated ceramic block of cellular construction having a catalytic coating covering a large interior and exterior area thereof for oxidizing smoke, odors, and other undesirable properties present in the hot gases flowing therethrough.

A still further object of the present invention is to provide a catalytic oxidation unit having a temperature that is self-sustaining in that the unit does not require supplemental heating means whereby smoke, odors, and other undesirable properties present in the hot gases flowing therethrough undergo an exothermic reaction at a temperature of about 390° F., depending upon the gases being treated, the catalyst and the area of contact of the supporting substrate, at which point the rate of temperature rise of the oxidation unit increases above the rate of temperature rise of the combustion chamber in which the undesirable gaseous properties are generated until the unit temperature exceeds the oven air temperature.

The present invention, in accordance with one form thereof is embodied in a catalytic oxidation unit which comprises a hollow housing having an inlet opening and an exhaust opening. A perforated ceramic block of cellular construction is transversely arranged within the housing for receiving hot gases therethrough and becoming heated thereby. A catalytic material covers the cellular surfaces that are exposed to the gases so as to reduce the temperature at which oxidation of smoke and odors occurs. The surface area of the cells is large to provide a longer period of contact between the gases and the catalyst. Hence at a minimum temperature of between 300° F. and 400° F. smoke, odors, and other undesirable gaseous products present in the hot gases will undergo an exothermic reaction and increase the rate of temperature rise of the ceramic block above the rate of temperature rise of the chamber in which said products were generated until the products have been incinerated.

Our invention will be better understood from the following description taken in conjunction with the accompanying drawings and its scope will be pointed out in the appended claims.

Figure 1:
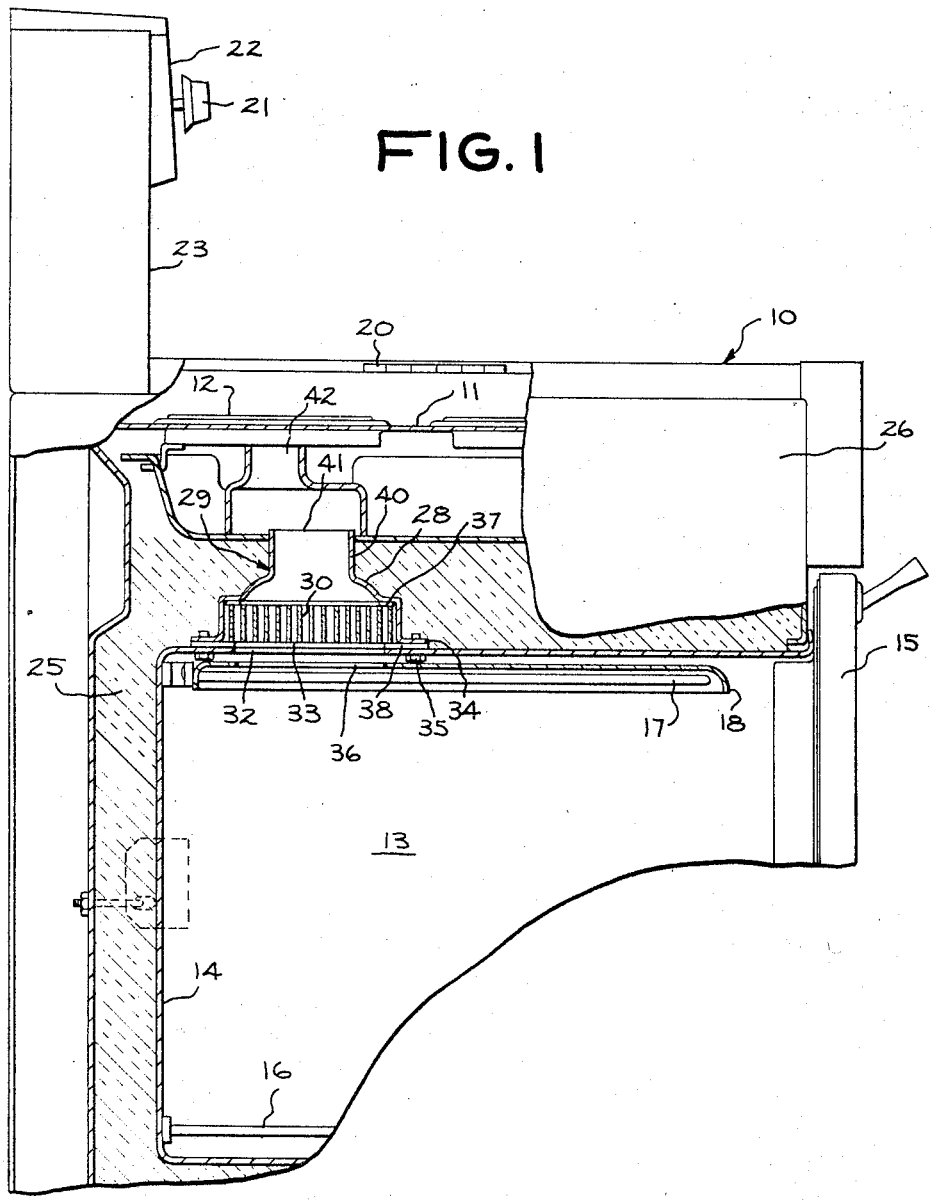
FIGURE 1 is a left side fragmentary elevational view of an electric range embodying the present invention with parts broken away to show the oven cavity and the vent system therefor which includes the catalytic oxidation unit embodying the present invention.

Turning to a consideration of the drawings and in particular to FIGURE 1, there is shown for illustrative purposes an electric range 10 having a top cooking surface or cooktop 11 with a plurality of surface heating elements 12, an oven cavity 13 formed by a box-like oven liner 14 and a front-opening drop door 15. The oven cavity is supplied with two standard heating elements; namely, a lower baking element 16 and an upper broiling element 17 combined with an inverted reflector pan 18 which overlies the same for directing radiant energy in a downward direction during broiling operations. The surface heating elements 12 are controlled by selector switches 20 located in the side-arms of the cooktop 11, while the oven heating elements 16 and 17 are controlled by an oven selector switch and thermostat 21 which are positioned in the control panel 22 of a backsplasher 23, that is vertically positioned along the back edge of the cooktop 11.

As is conventional in this art the oven liner 14 is surrounded by thermal insulating material 25 such as fiberglass or the like for retaining the heat generated within the oven cavity. A range body or cabinet structure 26 forms the external structure of the range for supporting the various elements therein, and it is provided with an appearance finish of porcelain enamel, stainless steel or the like as is conventional in this art.

It is standard practice to provide an oven vent or exhaust duct communicating with the kitchen atmosphere; especially, for use during broiling operations when a large volume of room air is passed through the oven usually by means of a partially open oven door so as to hold down the oven air temperature since the broiling operation utilizes a maximum temperature setting of the oven thermostat. In place of a standard exhaust duct we have substituted on the top wall of the oven liner a catalytic oxidation unit 28 which comprises a hollow housing 29 and a perforated ceramic block 30 of cellular construction supported transversely in the housing for receiving the hot oven gases therethrough and becoming heated thereby. The top wall of the oven liner 14 is provided with a vent opening 32 over which the housing 29 of the oxidation unit is mounted. The bottom wall of the housing has an inlet opening 33 corresponding to the size and shape of the vent opening 32 in the oven liner to provide freedom of movement of the oven gases into the housing. The bottom edge of the housing 29 is provided with an annular flange 34 for receiving fastening screws 35 therethrough which are mounted to the top wall of the oven liner 14. Notice that an opening 36 is formed in the reflector pan 18 to coincide with the vent opening 32 so that the radiant energy of the oxidation unit will complement the oven heaters 16 and 17.

The ceramic block 30 is thermally insulated from the metal housing 29 by use of top and bottom asbestos gaskets 37 and 38 so as to restrict the heat path from the block to the housing as well as to provide a cushion support for the ceramic block since it is of rather frangible material thereby permitting expansion and contraction and avoiding destructive forces due to thermal expansion and the like. The housing 29 is provided with an elongated chimney section 40 of reduced transverse cross-section directly above the ceramic block 30 to assist in creating a chimney effect and increasing the rate of flow of hot oven gases through the oxidation unit. The top edge of the chimney section 40 has an exhaust opening 41 which communicates with a section of angularly offset duct work 42 so that the hot gases will be discharged to the atmosphere through an opening (not shown) under one of the surface heating elements 12 as is conventional in this art. The reason for utilizing the offset duct work 42 is to avoid the possibility of having liquids spill onto the surface heating unit and directly through the vent into the oven cavity.

Figure 2:
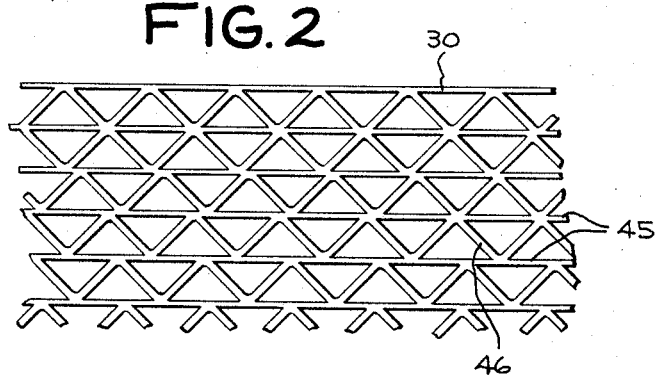
FIGURE 2 is a plan view on a greatly enlarged scale of a perforated ceramic block of cellular construction which is used as the main element of the oxidation unit embodying the present invention.

The particular form of the ceramic block 30 that has been found acceptable is best illustrated in the plan view of FIGURE 2. A typical ceramic support used is sold by the Minnesota Mining and Manufacturing Company through the American Lava Corporation and having the designation "corrugated ceramic." Two kinds of ceramic that have been found successful are cordierite and alumina. The term "corrugated ceramic" is apparently derived from the fact that the material is of cellular construction having a configuration of multiple layers of corrugated paper in that there are a series of parallel spaced dividers 45 which are separated by a corrugated spacer 46. The corrugations are about seven corrugations per inch and the width of each cell is about .100 inch. The depth of the block is about one half an inch. Thus it can be seen that the ceramic block is indeed perforated and of cellular construction. It might be described by some as depicting a "honeycomb" except that the cells are not hexagonal in configuration as is a true honeycomb.

A catalytic material such as a platinum coating is applied to the ceramic block 30 and particularly the interior surfaces of the cells thereof which are in contact with the hot oven gases flowing therethrough. The cellular block divides the flow of combustible products into a plurality of five separate streams to provide an extended area and period of contact of the catalyst and the hot gases.

The normal cooking temperatures in a domestic oven range between about 150° F. and 550° F. Within recent times a self-cleaning oven design has been introduced on the market and manufactured according to the teachings of Patent 3,121,158 of Bohdan Hurko that was mentioned above. Such an oven design uses a pyrolytic technique for removing the food soils and grease splatter that accumulate on the surfaces of the oven liner. This is done by raising the oven temperature to a heat cleaning temperature somewhere between 750° F. and 950° F. and holding it for a sufficient length of time to reduce the food soil and grease spatter into gaseous products which are further degraded in a catalytic oxidation unit before the gases are returned to the kitchen atmosphere. The first commercial embodiment of the Hurko invention utilized an oxidation unit built according to the teachings of the Welch patent 2,900,483, mentioned above. It has a supplemental heater for heating a platinum coated wire screen which serves as a catalytic surface for oxidizing the smoke and odors present in the oven exhaust gases. However, the wires of the screen have a very small surface area and they are contacted by the gases for only a fleeting moment as compared with the elongated cells of the present invention.

The heating of the food soils and grease splatter within the oven cavity during the heat cleaning operation produces corresponding primary gaseous degradation products which are combined with a controlled amount of ambient air brought into the oven cavity. Such degradation products include methane, ethane, water vapor, carbon dioxide, some free carbon and other elements. Moreover smoke, odors, and other undesirable properties are generated at temperatures of around 380° F., and it is important to be able to eliminate these before the hot oven gases are returned to the kitchen atmosphere.

Figure 3:
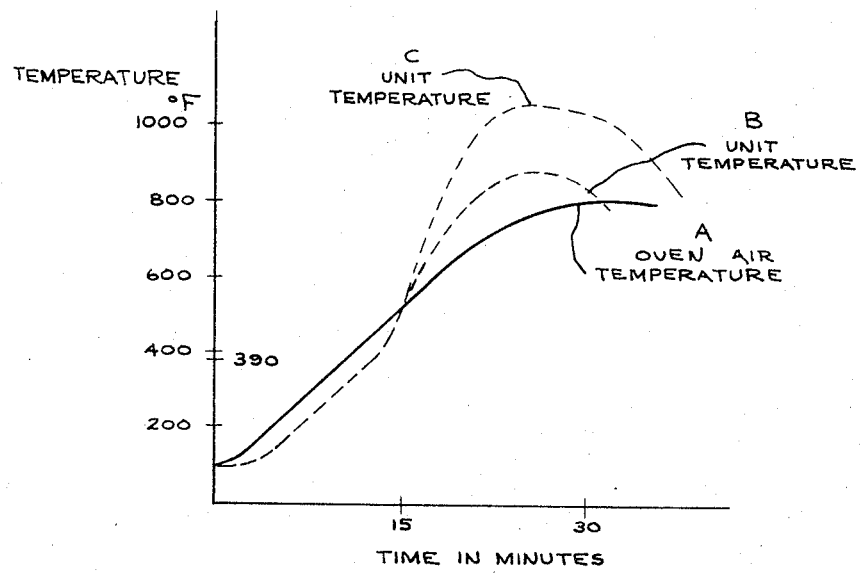
FIGURE 3 is a time-temperature graph illustrating the relative change of oven air temperature with respect to the temperature of the oxidation unit and showing the result of the exothermic reaction of the smoke, odors, etc., that are generated in the oven cavity at a temperature on the order of 390° F. and above, as a specific example.

A better understanding of the operation of the present inventive process can be had by studying the time-temperature graph of FIGURE 3 of one specific embodiment of this invention, where the time is plotted along the abscissa and the temperature is plotted along the ordinate, this graph includes three typical curves; namely, curves A, B and C. Curve A is the curve of a typical oven air temperature. Curve B is a typical temperature curve of the oxidation unit using a measured amount of grease load in the oven, for example, three teaspoons of food shortening. The third curve C is similar to curve B except that a heavier grease load of five teaspoons is used. The interesting point to note in these curves is the fact that the temperature of the oxidation unit and particularly the ceramic block lags the oven air temperature at the beginning of the cycle until the block temperature reaches about 390° F. at which point the rate of temperature rise of the ceramic block increases over the rate of temperature rise of the oven air temperature signifying the existence of an exothermic reaction as the smoke, odors, and other undesirable properties are oxidized in the catalytic unit. It is only a short time thereafter that the ceramic block temperature exceeds the oven air temperature and remains above the oven air temperature until all of the undesirable properties have been eliminated signifying the end of the heat cleaning cycle. The ceramic block temperature reaches its maximum point depending upon the amount of oven soil load and it starts to drop gradually and then at a greater rate once the smoke in the oven is no longer being produced. This particular temperature of about 390° F. is only critical for a particular type of gaseous products, a particular catalyst and a particular supporting substrate for the catalyst. The range of temperature probably extends between about 300° F. and 400° F.

Having described above a catalytic oxidation unit that is operable at relatively low temperatures without the use of supplemental heaters, it will be readily apparent to those skilled in this art that the ceramic block because of its relatively large surface areas of contact with the hot oven gases is in effect self-sustaining since its heat is supplied by the heat of smoke combustion. The oxidation of the smoke takes place at a much lower temperature than was believed possible heretofore. Also no preheating of the ceramic block is necessary because the smoke is not generated until the oven air temperature reaches about 380° F. and it so happens that the catalyst-coated ceramic block becomes operational at about 390° F. or at about the same point. It is well to appreciate the necessity for controlling the amount of ambient air that is introduced into the oven cavity during this smoke eliminating process. A small air flow resulting in a slow heat exchange between the air and catalytic unit would cause the ceramic block temperature to lag the oven air temperature at the start of the heating cycle by about 100° F. On the other hand if more air flow is permitted in the oven such that there would be more hot air flow through the ceramic block the temperature would closely approximate the oven air temperature before the block temperature reaches the 390° F. temperature.

Moreover, it will be understood by those skilled in this art that while the starting temperature of the exothermic raction has been located between a temperature range of 300° F. and 400° F., the particular temperature in a given situation will depend upon the following factors: the kind of smoke and undesirable gases being treated by the oxidation unit, the type of catalyst being used, and both the kind and area of contact of the supporting substrate or ceramic material.

Modifications of this invention will occur to those skilled in this art, therefore, it is to be understood that this invention is not limited to the particular embodiments disclosed but that it is intended to cover all modifications which are within the true spirit and scope of this invention as claimed.

What we claim as new and desire to secure by Letters Patent of the United States is:

1. A self-sustaining catalytic oxidation unit for receiving the exhaust gases from a self-cleaning pyrolytic cooking oven, said unit comprising a tubular housing, a perforated ceramic block of cellular construction arranged transversely of the housing for receiving combustion products therethrough, and a catalytic coating covering the outer surfaces of the ceramic block, whereby combustible products introduced into one end of the housing at temperatures of about 300° F. and above will undergo an exothermic reaction and increase the temperature of the unit until all of the objectional components of the combustible products have been oxidized.

2. A self-sustaining catalytic oxidation unit for receiving the exhaust gases from a self-cleaning pyrolytic cooking oven, said unit comprising a hollow housing with an inlet opening and an exhaust opening, a perforated ceramic block of fine cellular construction positioned in the housing for receiving hot gases therethrough, a coating of catalytic material covering the visible surfaces of the ceramic block, whereby the gases undergo an exothermic reaction when the ceramic block reaches a temperature on the order of from 300° F. to 400° F. until all smoke, odor and other undesirable properties in the gases have been oxidized.

3. A self-sustaining catalytic oxidation unit for receiving the exhaust gases from a self-cleaning pyrolytic cooking oven, said unit comprising a hollow housing with an inlet opening and an exhaust opening, a perforated ceramic block of fine cellular construction positioned within the housing for receiving hot combustible gases therethrough, a catalytic material cooperating with the perforated block for oxidizing all smoke and odors in the hot gases before the gases are expelled through the exhaust opening, said oxidation taking place when the temperatures of the gases and the ceramic block are on the order of 390° F. and above.

4. A self-sustaining catalytic oxidation unit for use in the exhaust vent of a self-sustaining pyrolytic cooking oven, said unit comprising a hollow housing with an inlet opening adapted for communication with the oven, and an exhaust opening adapted to be open to the atmosphere, where the oven is operated during normal cooking operations at temperatures between about 150° F. and 550° F., a perforated ceramic block of cellular construction arranged transversely of the housing for receiving the hot oven gases therethrough and becoming heated thereby, and a catalytic material covering the visible surfaces of the ceramic block, so that when smoke and odors are present in the oven gases the smoke and odors will be oxidized by the heated ceramic block before leaving the oxidation unit.

5. A self-supporting catalytic oxidation unit for use in an exhaust vent of a self-cleaning pyrolytic cooking oven, said unit comprising a hollow housing with an inlet opening and an exhaust opening, and a perforated ceramic block of cellular construction arranged transversely of the housing for receiving the hot oven gases therethrough and becoming heated thereby, a catalytic material covering the visible surfaces of the ceramic block, where the oven is adapted to be operated at normal cooking temperatures between about 150° F. and 550° F. and at heat cleaning temperatures somewhere between about 750° F. and 950° F., the oxidation unit being so operable that the temperature of the ceramic block lags behind the oven air temperature until reaching a temperature of about 390° F. at which point the smoke generated within the oven undergoes and exothermic reaction in contact with the ceramic block and thereby raises the temperature of the block at a faster rate than the rate of increase of the oven air temperature until finally the block temperature exceeds the oven air temperature until all smoke and odors generated within the oven are oxidized at the completion of the heat cleaning operation.

References Cited

UNITED STATES PATENTS

| | | | |
|---|---|---|---|
| 2,742,437 | 4/1956 | Houdry | 23—288 XR |
| 3,172,251 | 3/1965 | Johnson | 23—288 XR |
| 3,211,534 | 10/1965 | Ridgway | 23—288 XR |

MORRIS O. WOLK, *Primary Examiner.*

M. D. BURNS, *Assistant Examiner.*

U.S. Cl. X.R.

219—397; 23—277; 134—19, 1; 126—21